P. DENNIS.
Shovel-Plow.
No. 19,412. Patented Feb. 23, 1858.
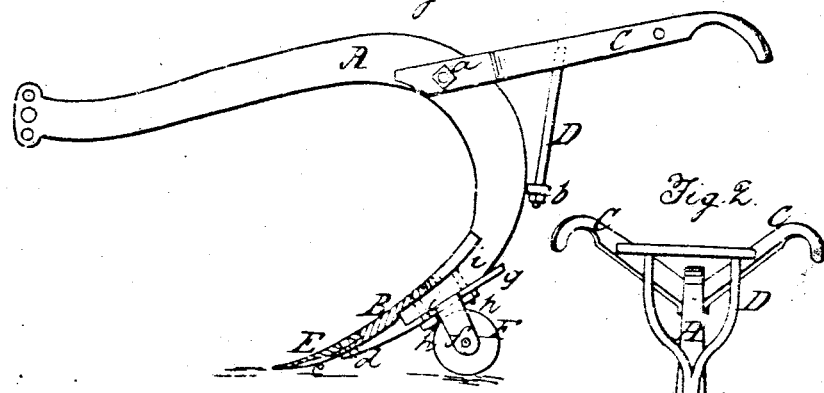
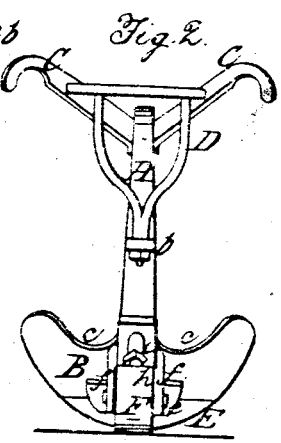
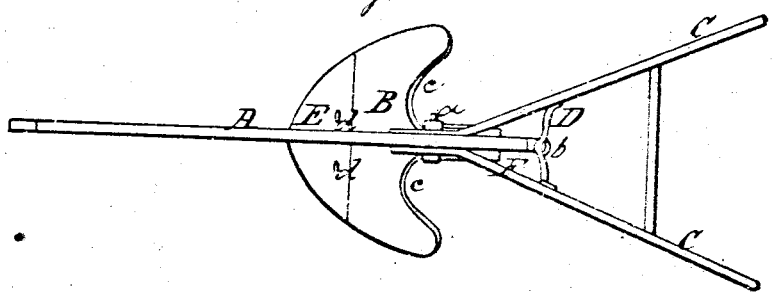

UNITED STATES PATENT OFFICE.

PAUL DENNIS, OF BEMUS HEIGHTS, NEW YORK.

IMPROVEMENT IN SHOVEL-PLOWS.

Specification forming part of Letters Patent No. 19,112, dated February 23, 1858.

*To all whom it may concern:*

Be it known that I, PAUL DENNIS, of Bemus Heights, in the county of Saratoga and State of New York, have invented a new and Improved Shovel-Plow; and I do hereby declare that the following is a full, clear, and exact description of the same, reference being had to the annexed drawings, making a part of this specification, in which—

Figure 1 is a side view of my improvement; Fig. 2, a back view of the same, and Fig. 3 a plan or top view of the same.

Similar letters of reference indicate corresponding parts in the several figures.

This invention consists in a peculiarly-constructed mold-board, an adjustable gage-roller, and a point or share made separately from the mold-board and attached to it, as hereinafter shown, whereby the share and mold-board may be made to penetrate the soil at a greater or less depth, as may be desired, the point or share readily removed from the mold-board when necessary to be ground or replaced by a new one, and the soil made to pass over the mold-board into the furrow, so that the surface will be left in a mellow but level state, with all weeds, grass, roots, &c., properly cut up.

To enable those skilled in the art to fully understand and construct my invention, I will proceed to describe it.

A represents a metallic bar, which is curved so that the front part will form the beam of the implement, and the back part an inclined portion, to which the mold-board B is firmly attached. The form of the bar A is clearly shown in Fig. 1.

To the bar A, near the center of its curve or bend, the lower ends of handles C C are attached by a bolt, as shown at *a*. These handles are braced by a V-shaped support, D, the lower end of which is secured to the bar A, as shown at *b*.

The mold-board B is of shovel form, and is much like those usually made, with the exception that its upper edge or part is scalloped out so as to form a recess, *e*, at each side of the bar A, as shown clearly in Figs. 2 and 3, said recesses extending down nearly or about one-half the length of the mold-board. The mold-board is constructed of malleable cast-iron.

E is the point or share, which is constructed of steel, the lower end being pivoted and its sides slightly rounded or curved, so that the form of the mold-board and point or share, when connected together, will clearly approximate to those that are cast in one piece, the recesses *e* being excepted. The point or share E may be attached to the mold-board B by bolts *d*, which are attached to the under side of the point or share, and pass through a projecting plate, *e*, at the under side of the mold-board. (See Figs. 1 and 2.)

F is an adjustable metallic roller, which is attached to the bar A just back of the mold-board B. The axis of the roller F is fitted or has its bearings in arms *f f*, which project obliquely from a plate, *g*, said plate being slotted longitudinally, so that bolts *h h*, which secure the mold-board to the bar, may pass through said slot, the bolts *h* having each a nut, *i*, on them, by screwing up which the plate *g*, and consequently the roller F, may be secured higher or lower, as desired.

From the above description it will be seen that the point or share E and mold-board B may be made to penetrate the soil at a greater or less depth, as may be desired, by adjusting the roller F and draft-chain, said roller serving as a gage or guide and the draft-chain being adjusted at the end of the beam, so that the draft may aid the roller. The point or share may be made to have a tendency to penetrate the soil or otherwise. This will be understood by referring to Fig. 1, in which it will be seen that by depressing or lowering the roller on the bar the mold-board will be less inclined, and consequently if the draft-chain or whiffle-tree be properly adjusted at the end of the beam the point or share will have a greater tendency to penetrate the earth than if the roller were higher up on the bar, the roller always bearing upon the earth. The mold-board B does not cast the earth from either side, as usual; but the earth, in consequence of the recesses *e e*, will pass over the top of the mold-board, which will in consequence form no furrow, but will leave the soil in a loose or mellow state and nearly level with all grass, weeds, roots, and the like perfectly cut up. The point or share E, also, in consequence of being made separate of steel and attached to the mold-board, may be readily detached and sharpened, and when much worn a new one may be attached to the mold-board. The plow therefore is not only rendered far more durable, but it may always be kept in perfect order, for the mold-board will last an indefinite period of time, it not being subjected to much wear, and the plow will always be in order provided the points or shares are kept in perfect order. By my improvement this can be done; but it cannot be done when the mold-board and share are cast in one piece. The ordinary shovel-plows cannot be regulated by the draft-chain so as to regulate the depth of the furrow, for they have no guide, the point or share merely penetrating the soil. The roller F in my improvement diminishes friction and serves as a more perfect guide than the landside of ordinary plows.

Having thus described my invention, what I claim as new, and desire to secure by Letters Patent, is—

The bar A and mold-board B E, in combination with the adjustable roller E, the whole being constructed and arranged substantially as and for the purpose set forth.

PAUL DENNIS.

Witnesses:
 J. K. PRESTON,
 M. McNAUGHTON.